(12) United States Patent
Lee et al.

(10) Patent No.: US 11,943,324 B2
(45) Date of Patent: Mar. 26, 2024

(54) ELECTRONIC DEVICE SUPPORTING VARIABLE COMPRESSION RATE ON BASIS OF RADIO LINK CONDITION

(71) Applicant: LG ELECTRONICS INC., Seoul (KR)

(72) Inventors: Kyuin Lee, Seoul (KR); Hyowon Bae, Seoul (KR); Jaewook Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 17/594,514

(22) PCT Filed: May 23, 2019

(86) PCT No.: PCT/KR2019/006159
§ 371 (c)(1),
(2) Date: Oct. 20, 2021

(87) PCT Pub. No.: WO2020/235720
PCT Pub. Date: Nov. 26, 2020

(65) Prior Publication Data
US 2022/0182469 A1      Jun. 9, 2022

(51) Int. Cl.
*H04L 69/04* (2022.01)
*H04B 17/336* (2015.01)
(Continued)

(52) U.S. Cl.
CPC .......... *H04L 69/04* (2013.01); *H04B 17/336* (2015.01); *H04L 1/0005* (2013.01); *H04L 1/0009* (2013.01); *H04B 7/0413* (2013.01)

(58) Field of Classification Search
CPC ...... H04B 7/0617; H04B 7/088; H04B 17/14; H04B 17/336; H04B 7/0695;
(Continued)

(56) References Cited

U.S. PATENT DOCUMENTS 10,886,979 B2 * 1/2021 Forenza ............... H04B 7/0452
2013/0143494 A1 6/2013 Chen et al.
(Continued)

FOREIGN PATENT DOCUMENTS

KR   20140040066   4/2014
KR   20180035139   4/2018

OTHER PUBLICATIONS

PCT International Application No. PCT/KR2019/006159, International Search Report dated Feb. 21, 2020, 6 pages.

*Primary Examiner* — Brian D Nguyen
(74) *Attorney, Agent, or Firm* — LEE, HONG, DEGERMAN, KANG & WAIMEY

(57) ABSTRACT

An electronic device according to one embodiment of the present invention comprises: a first transmission antenna module which transmits a monitoring signal for a radio link on the basis of a preset transmission antenna weight vector according to a first control signal; a first reception antenna module which receives the monitoring signal from the first transmission antenna module on the basis of a preset reception antenna weight vector, and generates first and second monitoring result information on the basis of the monitoring signal; a second transmission antenna module which transmits the first and second monitoring result information; a second reception antenna module which receives the first and second monitoring information from the second transmission antenna module; a processor which transmits the first control signal and a second control signal associated with a compression rate determined on the basis of the first and second monitoring information; and a data compression module which performs compression on a data stream on the basis of the second control signal.

11 Claims, 19 Drawing Sheets

(51) Int. Cl.
*H04L 1/00* (2006.01)
*H04B 7/0413* (2017.01)

(58) Field of Classification Search
CPC ... H04B 17/318; H04B 7/0413; H04L 1/0005; H04L 1/0009; H04L 1/0034; H04L 69/04; H04L 1/0014; H04L 1/0003; H04N 21/2383; H04N 21/24; H04N 21/238; H04N 21/2343; H04W 24/08
See application file for complete search history.

(56) References Cited

U.S. PATENT DOCUMENTS

| | | |
|---|---|---|
| 2018/0365975 A1 | 12/2018 | Xu et al. |
| 2019/0140340 A1 | 5/2019 | Ramasamy et al. |
| 2019/0140730 A1* | 5/2019 | Oteri ................ H04B 7/0452 |
| 2020/0343960 A1* | 10/2020 | Li ..................... H04L 1/1614 |
| 2020/0404617 A1* | 12/2020 | Murray ............. H04W 68/02 |
| 2021/0028850 A1* | 1/2021 | Elliott ............... H04B 7/088 |
| 2021/0143887 A1* | 5/2021 | Oteri ................ H04L 5/0023 |

* cited by examiner (A)

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

ELECTRONIC DEVICE SUPPORTING VARIABLE COMPRESSION RATE ON BASIS OF RADIO LINK CONDITION

CROSS-REFERENCE TO RELATED APPLICATIONS

This application is the National Stage filing under 35 U.S.C. 371 of International Application No. PCT/KR2019/006159, filed on May 23, 2019, the contents of which is hereby incorporated by reference herein in its entirety.

BACKGROUND

Field of the Disclosure

The present specification relates to an electronic device, and more particularly, to an electronic device supporting a variable compression rate based on a radio link condition.

Related Art

Recently, there is a growing demand for high-resolution and high-quality pictures such as a high definition (HD) picture and an ultra-high definition (UHD) picture in various fields. The higher the resolution and quality of picture data, the greater the amount of information of bits to be transmitted relative to the existing picture data. Therefore, transmission cost may increase when the picture data is transmitted using a medium such as the existing wired/wireless broadband line.

Meanwhile, the Institute of Electrical and Electronics Engineers (IEEE) 802.11ad standard is an ultra-high speed wireless communication standard, which operates in a band of 60 GHz or more. The coverage range of signal is approximately 10 meters, but a throughput of 6 Gbps or more may be supported. Since operation is performed in a high frequency band, a signal propagation is dominated by a ray-like propagation. Signal quality may be improved so that a transmit (TX) or receive (RX) antenna beam can be arranged to be directed toward a strong spatial signal path.

The IEEE 802.11ad standard provides a beamforming training procedure for antenna beam arrangement. Meanwhile, IEEE 802.11ay is a next generation standard, which is under development in order to achieve a throughput of 20 Gbps or more.

SUMMARY

The present specification provides an electronic device supporting a variable compression rate to maintain the best image quality and minimize screen stuttering by monitoring a radio link condition and selecting a compression rate of a data stream suitable for the radio link condition.

An electronic device according to the present embodiment includes: a first transmit (Tx) antenna module which transmits a monitoring signal for a radio link, based on a pre-set Tx antenna weight vector according to/based on a first control signal; a first receive (Rx) antenna module which receives the monitoring signal from the first Tx antenna module, based on the pre-set Rx antenna weight vector, and which generates first and second monitoring result information, based on the monitoring signal; a second Tx antenna module which transmits the first and second monitoring result information; a second Rx antenna module which receives the first and second monitoring information from the second Tx antenna module; a processor which transfers the first control signal and a second control signal associated with/for a compression rate determined based on the first and second monitoring information; and a data compression module which performs compression on a data stream, based on the second control signal.

According to an embodiment of the present specification, an electronic device supporting a variable compression rate can be provided to maintain the best image quality and minimize screen stuttering by monitoring a radio link condition and selecting a compression rate of a data stream suitable for the radio link condition.

BRIEF DESCRIPTION OF THE DRAWINGS

FIG. 8 is a diagram showing a PPDU structure according to an embodiment of the present disclosure.

DESCRIPTION OF EXEMPLARY EMBODIMENTS

The above-described features and the following detailed description are exemplary contents for helping a description and understanding of the present specification. That is, the present specification is not limited to this embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

Figure 1:
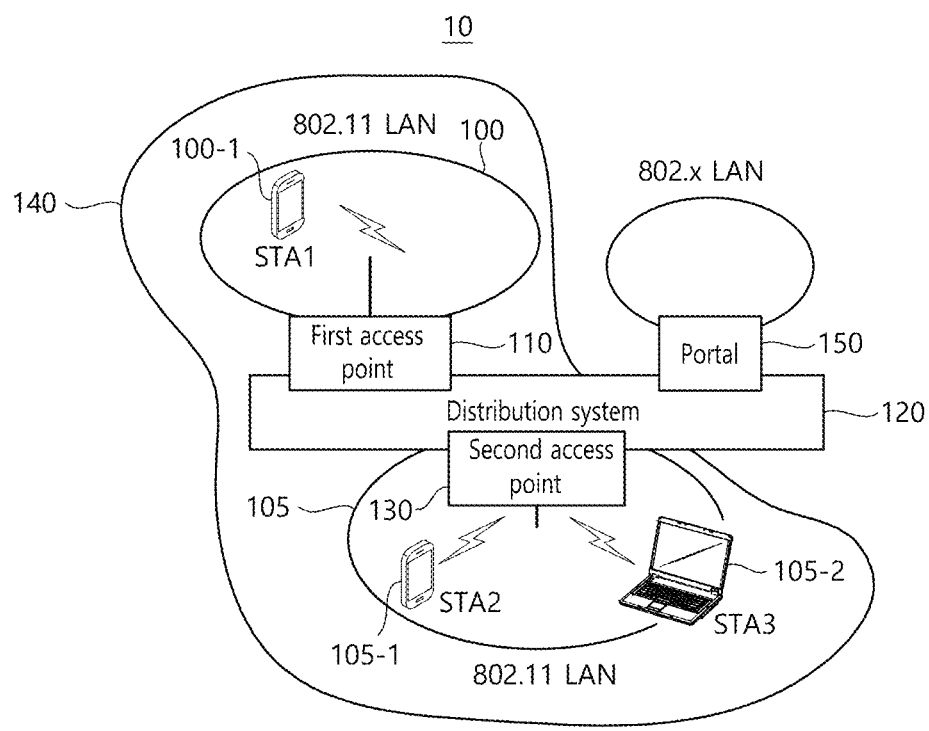
FIG. 1 is a conceptual diagram showing a structure of a wireless LAN system.
Figure 1:
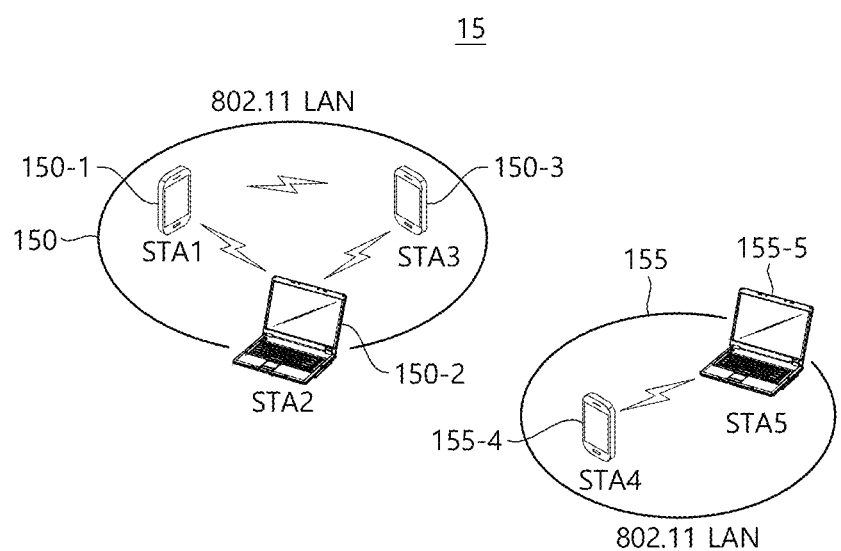

FIG. 1 is a conceptual diagram showing a structure of a wireless LAN system. FIG. 1(A) shows a structure of an infrastructure network of Institute of Electrical and Electronic engineers (IEEE) 802.11.

Referring to (A) of FIG. 1, the wireless system (10) shown in (A) of FIG. 1 may include at least one basic service set (BSS) (100, 105). A BSS is a set of an access point (hereinafter referred to as 'AP') and a station (hereinafter referred to as 'STA') that can perform communication between one another by successfully establishing synchronization and does not refer to a specific area.

For example, a first BSS (100) may include a first AP (110) and a single first STA (100-1). A second BSS (105) may include a second AP (130) and one or more STAs (105-1, 105-2).

The infrastructure BSSs (100, 105) may include at least one STA, APs (110, 130) providing a distribution service, and a distribution system (DS) (120) that connects the multiple APs.

The distribution system (120) may implement an extended service set (ESS) (140) by connecting the plurality of BSSs (100, 105). The ESS (140) may be used as a term indicating a network that connects one or more APs (110, 130) through the distribution system (120). One or more APs included in the single ESS (140) may have the same service set identifier (hereinafter referred to as 'SSID').

A portal (150) may serve as a bridge for connecting the wireless LAN network (IEEE 802.11) to another network (e.g., 802.X).

In the wireless LAN system having the structure shown in (A) of FIG. 1, a network between the APs (110, 130) and a network between the APs (110, 130) and the STAs (100-1, 105-1, 105-2) can be implemented.

(B) of FIG. 1 is a conceptual diagram showing an independent BSS. Referring to (B) of FIG. 1, a wireless LAN system (15) shown in (B) of FIG. 1 may establish a network between STAs without the APs (110, 130) such that the STAs can perform communication, unlike the wireless LAN system of (A) of FIG. 1. A network established between STAs without the APs (110, 130) for communication is defined as an ad-hoc network or an independent basic service set (hereinafter referred to as 'IBSS').

Referring to (B) of FIG. 1, the IBSS (15) is a BSS operating in an ad-hoc mode. The IBSS does not have a centralized management entity because an AP is not included therein. Accordingly, STAs (150-1, 150-2, 150-3, 155-4, 155-5) are managed in a distributed manner in the IBSS (15).

All STAs (150-1, 150-2, 150-3, 155-4, 155-5) of the IBSS may be configured as mobile STAs and are not allowed to access a distributed system. All STAs of the IBSS configure a self-contained network.

An STA mentioned in the present disclosure is an arbitrary functional medium including medium access control (MAC) conforming to regulations of Institute of Electrical and Electronics Engineers (IEEE) 802.11 and a physical layer interface for a wireless medium, and a broad meaning of this term may include both an AP and a non-AP station.

The STA mentioned in the present disclosure may also be referred to by using various terms, such as a mobile terminal, a wireless device, a wireless transmit/receive unit (WTRU), a user equipment (UE), a mobile station (MS), a mobile subscriber unit, and, simply, a user.

Figure 2:
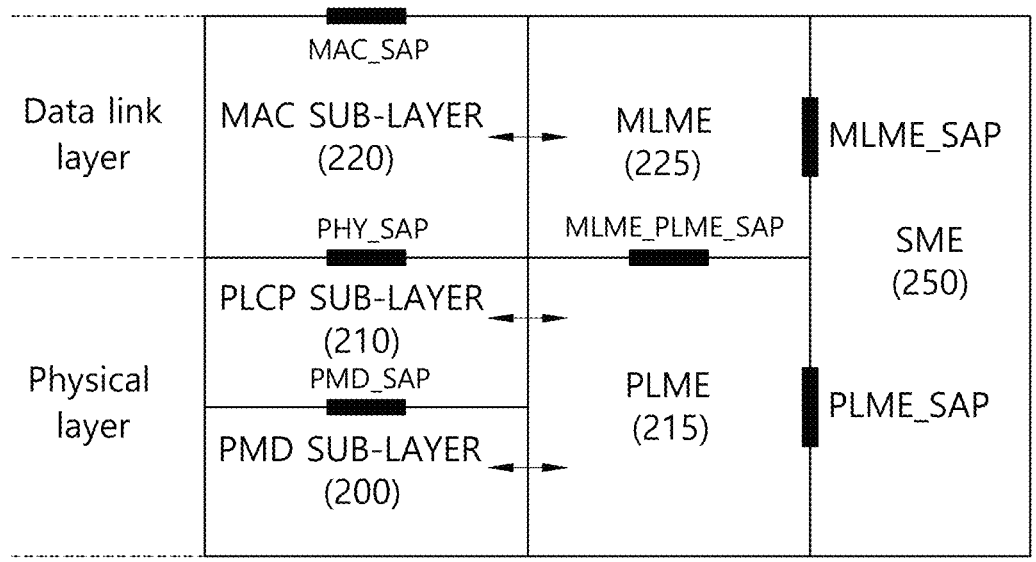
FIG. 2 is a conceptual diagram of a hierarchical architecture of a wireless LAN system supported by IEEE 802.11.

FIG. 2 is a conceptual diagram of a hierarchical architecture of a wireless LAN system supported by IEEE 802.11. Referring to FIG. 2, the hierarchical architecture of the wireless LAN system may include a physical medium dependent (PMD) sublayer (200), a physical layer convergence procedure (PLCP) sublayer (210), and a medium access control (MAC) sublayer (220).

The PMD sublayer (200) may serve as a transport interface for transmitting and receiving data between STAs. The PLCP sublayer (210) is implemented such that the MAC sublayer (220) can operate with minimum dependency on the PMD sublayer (200).

The PMD sublayer (200), the PLCP sublayer (210), and the MAC sublayer (220) may conceptually include a management entity. For example, a manager of the MAC sublayer (220) is called a MAC layer management entity (MLME) (225). A manager of the physical layer is called a PHY layer management entity (PLME) (215).

These managers may provide interfaces for performing layer management operation. For example, the PLME (215) may be connected to the MLME (225) to perform a management operation of the PLCP sublayer (210) and the PMD sublayer (200). The MLME (225) may be connected to the PLME (215) to perform a management operation of the MAC sublayer (220).

In order to perform correct MAC layer operation, an STA management entity (SME) (250) may be provided. The SME (250) may be operated as an independent component in each layer. The PLME (215), the MLME (225), and the SME (250) may transmit and receive information based on primitive.

The operation in each sublayer will be briefly described below. For example, the PLCP sublayer (210) transfers a MAC protocol data unit (MPDU) received from the MAC sublayer (220) to the PMD sublayer (200) or transfers a frame from the PMD sublayer (200) to the MAC sublayer (220) between the MAC sublayer (220) and the PMD sublayer (200) according to an instruction of the MAC layer.

The PMD sublayer (200) is a sublayer of PLCP and may perform data transmission and reception between STAs through a wireless medium. An MPDU transferred from the MAC sublayer (220) is referred to as a physical service data unit (PSDU) in the PLCP sublayer (210). Although the MPDU is similar to the PSDU, an individual MPDU may differ from an individual PSDU when an aggregated MPDU corresponding to an aggregation of a plurality of MPDU is transferred.

The PLCP sublayer (210) adds an additional field including information that is needed by a transceiver of the physical layer during a process of receiving a PSDU from the MAC sublayer (220) and transferring the PSDU to the PMD sublayer (200). At this point, the added field may be a PLCP preamble and a PLCP header added to the PSDU and tail bits needed for returning a convolution encoder to a zero state, and the like.

The PLCP sublayer (210) adds the aforementioned field to the PSDU to generate a PLCP protocol data unit (PPDU) and transmits the PPDU to a receiving station through the PMD sublayer (200), and the receiving station receives the PPDU and obtains information needed for data restoration from the PLCP preamble and the PLCP header in order to restore (or recover) data.

Figure 3:
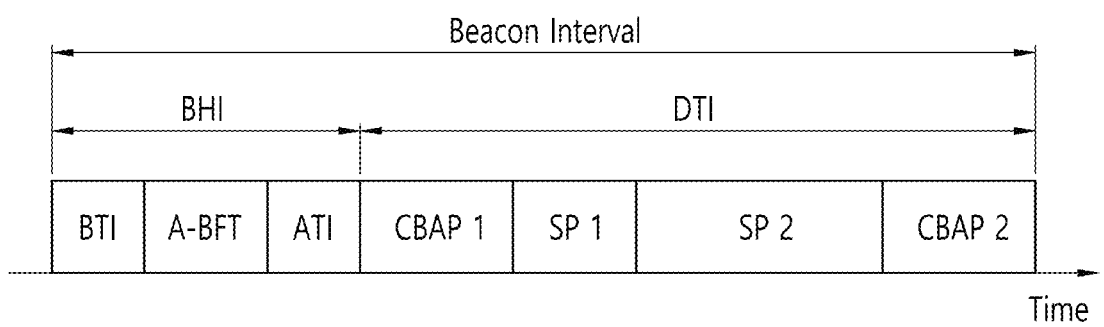
FIG. 3 is a diagram for describing an access period within a beacon interval.

FIG. 3 is a diagram for describing an access period within a beacon interval.

Referring to FIG. 3, time of a wireless medium may be defined based on a beacon interval between a beacon frame and a beacon frame. For example, a beacon interval may be 1024 milliseconds (msec).

A plurality of sub-periods within a beacon interval may be referred to as an access period. Different access periods within one beacon interval may have different access rules.

For example, information on an access period may be transmitted, by an AP or Personal basic service set Control Point (PCP), to a non-AP STA or non-PCP.

Referring to FIG. 3, one beacon interval may include a Beacon Header Interval (hereinafter referred to as 'BHI') and a Data Transfer Interval (hereinafter referred to as 'DTI').

For example, a BHI may be a time period starting from a target beacon transmission time (hereinafter referred to as 'TBTT') of a beacon interval and ending before the start (or beginning) of a DTI.

The BHI of FIG. 3 may include a Beacon Transmission Interval (hereinafter referred to as 'BTI'), an Association Beamforming Training (hereinafter referred to as 'A-BFT'), and an Announcement Transmission Interval (hereinafter referred to as 'ATI').

For example, a BTI may be a time period starting from the beginning (or start) of a first beacon frame to the end of a last beacon frame, which are transmitted by a wireless UE within a beacon interval. That is, a BTI may be a period during which one or more DMG beacon frames may be transmitted.

For example, an A-BFT may be a period during which beamforming training is performed by the STA that has transmitted the DMG beacon frame(s) during the preceding BTI.

For example, an ATI may be a Request-Response based management access period between a PCP/AP and a non-PCP/non-AP STA. The Data Transfer Interval (hereinafter referred to as 'DTI') of FIG. 3 may be a period during which frames are exchanged between multiple STAs.

As shown in FIG. 3, one or more Contention Based Access Periods (hereinafter referred to as 'CBAP') and one or more Service Periods (hereinafter referred to as 'SP') may be allocated to the DTI.

A DTI schedule of the beacon interval shown in FIG. 3 may be communicated through an Extended Schedule element, which is included in the beacon frame (or Announcement frame). That is, an Extended Schedule element may include schedule information for defining multiple allocations that are included in the beacon interval.

Detailed descriptions of the beacon frame are mentioned in Section 9.4.2.132 of the IEEE Draft P802.11-REVmc™/ D8.0, August 2016 'IEEE Standard for Information Technology Telecommunications and information exchange between systems—Local and metropolitan area networks— Specific requirements Part 11: Wireless LAN Medium Access Control (MAC) and Physical Layer (PHY) Specifications (hereinafter referred to as IEEE 802.11)', which was disclosed in August 2016.

Although FIG. 3 illustrates an example of two CBAPs and two SPs being allocated for one DTI, this is merely exemplary. And, therefore, it shall be understood that the present specification will not be limited only to this.

Figure 4:
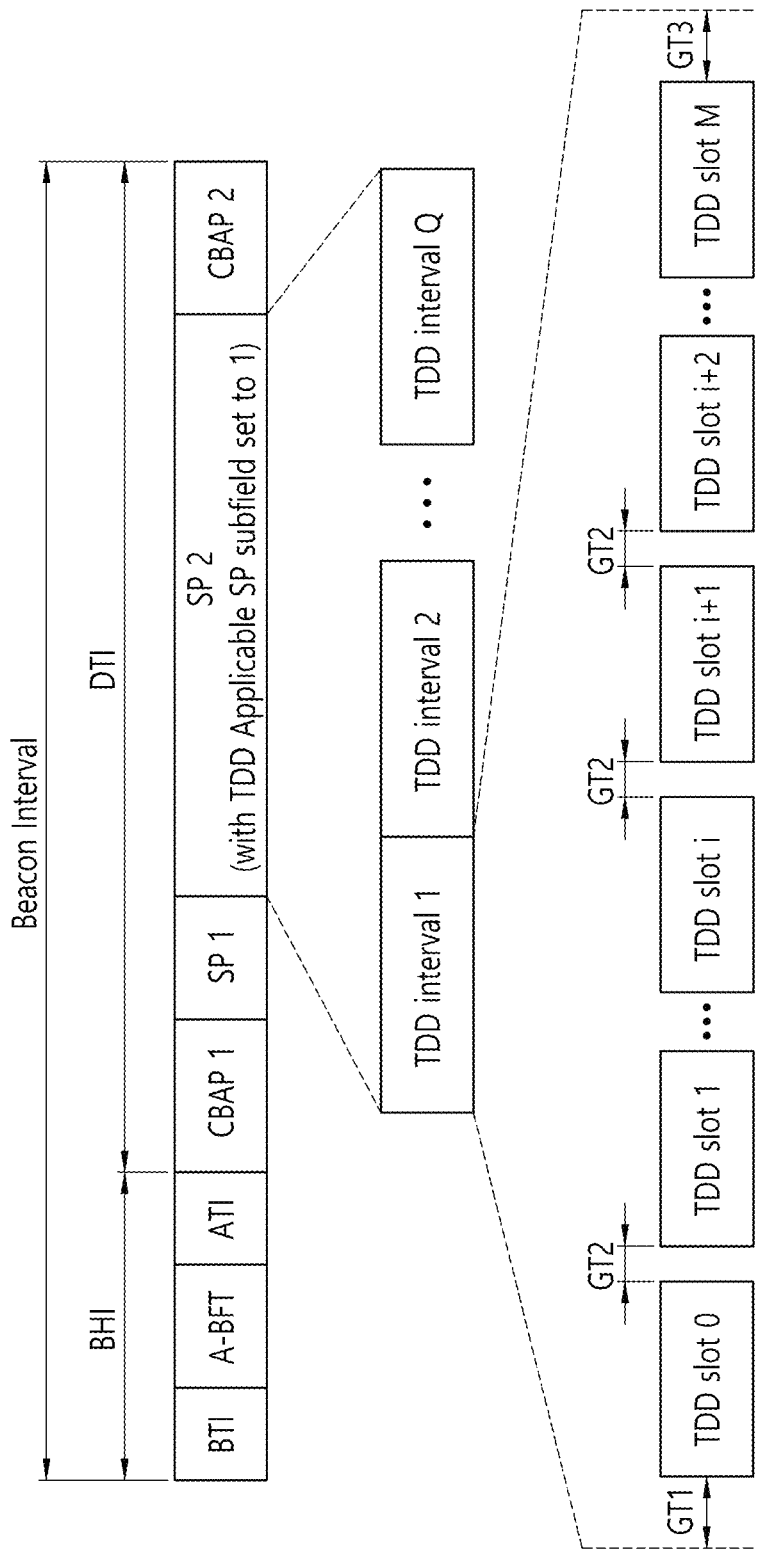
FIG. 4 is a conceptual diagram of a time division duplex (TDD) SP structure.

FIG. 4 is a conceptual diagram of a time division duplex (TDD) SP structure.

Referring to FIG. 1 to FIG. 4, among a plurality of allocation fields (not shown) that are included in the Extended Schedule element, which is included in a beacon frame, an allocation field for a second Service Period (SP2) of FIG. 4 may include a first subfield and a second subfield.

For example, the first subfield being included in the allocation field for the second Service Period (SP2) of FIG. 4 may be set to a value indicating SP allocation. Additionally, the second subfield being included in the allocation field for the second Service Period (SP2) of FIG. 4 may be set to a value indicating that the second service period (SP2) is a TDD SP that is based on TDD channel access.

In the present specification, when information for a TDD SP is included in the Extended Schedule element, the Extended Schedule element may be included in each beacon frame that is being transmitted.

Additionally, when an Extended Schedule element is transmitted at least one time from a beacon interval, with the exception for any special cases, the content of the Extended Schedule element may not be changed.

Referring to FIG. 4, the structure of the second service period (SP2), which is a TDD SP, may include a plurality of consecutive and adjacent TDD intervals (TDD interval 1~TDD interval Q, wherein Q is an integer). For example, a number of the plurality of TDD intervals of FIG. 4 may be equal to Q.

Additionally, each of the plurality of TDD intervals may include one or more TDD slots. For example, a first TDD interval (TDD interval 1) may include M+1 (wherein M is an integer) number of slots.

For example, a time interval starting from a start point of the first TDD interval (TDD interval 1) up to before a start point of a first TDD slot (i.e., TDD Slot 0), may be defined as a first guard time (hereinafter referred to as 'GT1').

For example, a time interval between each TDD slot included in the first TDD interval (TDD interval 1) may be defined as a second guard time (GT2).

For example, a time interval starting from an end point of an (M+1)th TDD slot (TDD slot M) up to an end point of the first TDD interval (TDD interval 1) may be defined as a third guard time (GT3).

For example, each of the plurality of TDD intervals (TDD interval 1~TDD interval Q) may have the same length. Each of the M+1 number of TDD slots (e.g., TDD slot 0~TDD slot M of FIG. 4) included in one TDD interval (e.g., TDD interval 1 of FIG. 4) may have a different length.

Referring to FIG. 4, the structure(s) of one or more TDD slots being included in the first TDD interval (i.e., TDD interval 1) may be repeatedly applied to the remaining TDD intervals (i.e., TDD interval 2~TDD interval Q).

Figure 5:
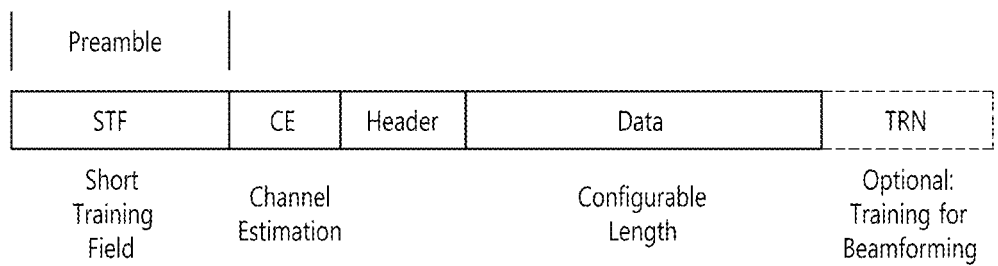
FIG. 5 is a diagram for describing a physical configuration of a related art radio frame.

FIG. 5 is a diagram for describing a physical configuration of a related art radio frame.

Referring FIG. 5, it is assumed that a Directional Multi-Gigabit (DMG) physical layer commonly includes the fields shown in FIG. 5. However, depending upon each mode, there may be differences in the regulation method and modulation/coding scheme(s) used for each separate field.

A preamble of the radio frame shown in FIG. 5 may include a Short Training Field (STF) and a Channel Estimation (CE) field. Additionally, the radio frame may include a header field, a data field for a payload, and a Training (TRN) field for beamforming.

Figure 6:
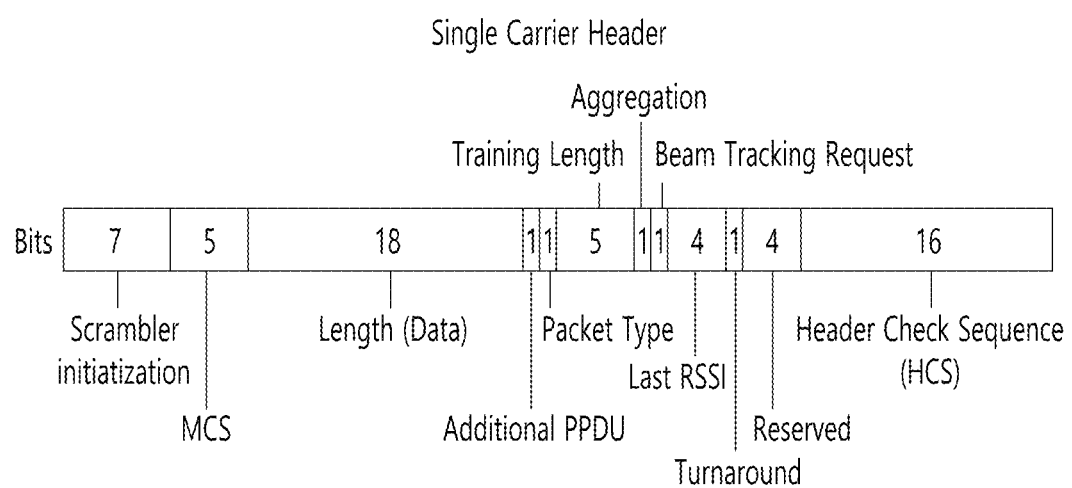
FIG. 6 and FIG. 7 are detailed diagrams showing a header field included in the radio frame of FIG. 5.
Figure 7:
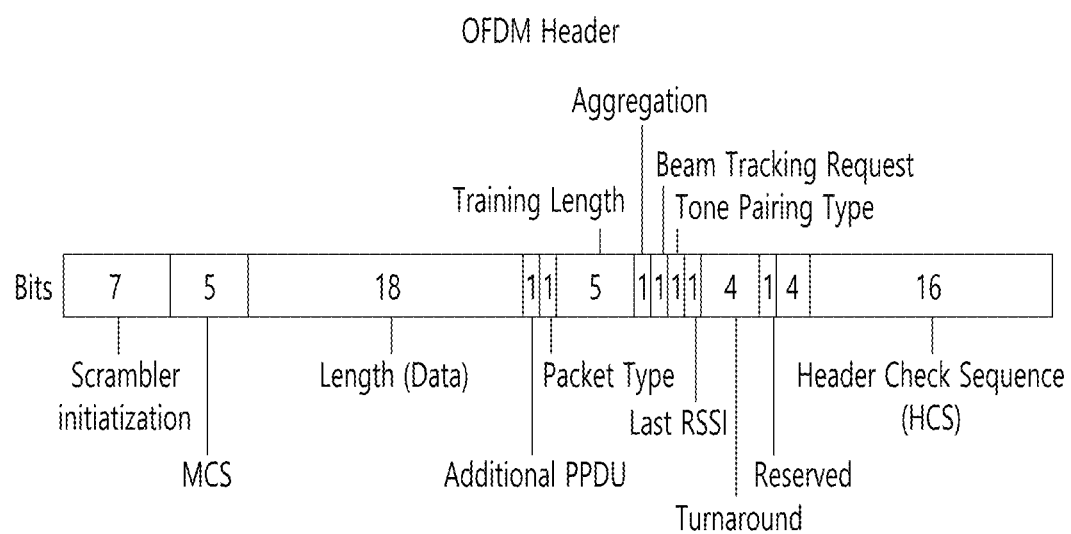

FIG. 6 and FIG. 7 are detailed diagrams showing a header field included in the radio frame of FIG. 5.

Referring to FIG. 6, the diagram shows a case where a Single Carrier (SC) mode is used. In the SC mode, the header field may include information, such as information indicating an initial value for scrambling, a Modulation and Coding Scheme (MCS), information indicating data length, information indicating the presence or absence of an additional Physical Protocol Data Unit (PPDU), a packet type, a training length, performance or non-performance of aggregation, presence or absence of a beam training request, a last Received Signal Strength Indicator (RSSI), performance or non-performance of truncation, Header Check Sequence (HCS), and so on. Additionally, as shown in FIG. 6, the header has 4 bits of reserved bits, and such reserved bits may be used as described below in the following description.

Referring to 7, the diagram shows a detailed configuration of the header field, when an OFDM mode is applied. For example, when the OFDM mode is applied, the header field may include information, such as information indicating an initial value for scrambling, an MCS, information indicating data length, information indicating the presence or absence of an additional PPDU, a packet type, a training length, performance or non-performance of aggregation, presence or absence of a beam training request, a last RSSI, performance or non-performance of truncation, Header Check Sequence (HCS), and so on.

As shown in FIG. 7, the header has 2 bits of reserved bits, and such reserved bits may be used as described below in the following description, just as in the case of FIG. 6.

Channel bonding and MIMO technology are adopted in the IEEE 802.11ay. In order to implement the channel bonding and MIMO technology in 11ay, a new PPDU structure is needed. That is, when using the conventional (or existing) 11ad PPDU structure, there are limitations in implementing the channel bonding and MIMO technology while supporting a legacy UE at the same time.

In the present specification, a new field for an 11ay UE may be defined after the legacy preamble and legacy header field that are used for supporting the legacy UE. Herein, the channel bonding and MIMO technology may be supported based on the newly defined field.

FIG. 8 is a diagram showing a PPDU structure according to an embodiment of the present disclosure. In FIG. 8, a horizontal axis may correspond to a time domain, and a vertical axis may correspond to a frequency domain.

When the channel bonding scheme is applied for two or more channels (e.g., CH1, CH2 of FIG. 8), a frequency band having a predetermined size (e.g., a 400 MHz band) may exist between frequency bands (e.g., 1.83 GHz) being used in each channel. In case of a Mixed mode, when a legacy preamble (e.g., L-STF, L-CE of FIG. 8) is duplicated and transmitted through each channel, the present embodiment may consider a transmission of a new STF and CE field (i.e., gap filling) together with the legacy preamble at the same time through a 400 MHz band between each channel.

In this case, as shown in FIG. 8, the PPDU structure according to the present disclosure may have a structure of transmitting an ay STF, ay CE, ay header B, and payload through a wideband after the legacy preamble, legacy header, and ay header A. Therefore, the ay header, ay payload fields, and so on being transmitted after the header field may be transmitted through channels that are used for bonding. Hereinafter, in order to differentiate the ay header from the legacy header, the ay header may also be referred to as an enhanced directional multi-gigabit (EDMG) header, and the corresponding term may be interchangeably used.

For example, a total of 6 or 8 channels (each 2.16 GHz) may exist in 11ay, and a maximum of 4 channels may be bonded and transmitted to a single STA. Accordingly, the ay header and ay payload may be transmitted through 2.16 GHz, 4.32 GHz, 6.48 GHz, 8.64 GHz bandwidths.

Alternatively, a PPDU format corresponding to a case where the legacy preamble is repeatedly transmitted without performing Gap-Filling may also be considered.

In this case, since Gap-Filling is not performed, without the GF-STF and GF-CE fields, which are marked in dotted lines in FIG. 8, the ay STF, ay CE, and ay header B are transmitted through a wideband after the legacy preamble, legacy header, and ay header A.

Figure 9:
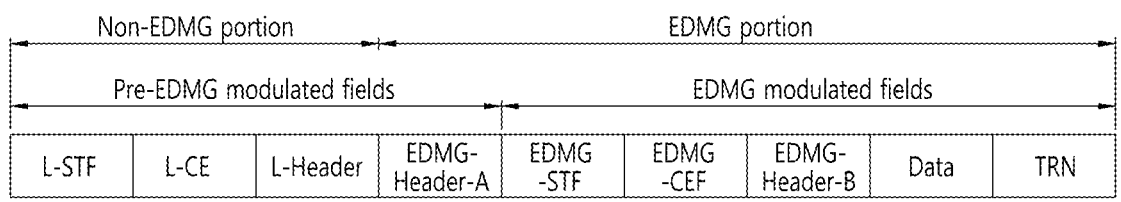
FIG. 9 is a diagram showing a PPDU structure according to the present embodiment.

FIG. 9 is a diagram showing a PPDU structure according to the present embodiment. When briefly summarizing the aforementioned PPDU format, the PPDU format may be as shown in FIG. 9.

As shown in FIG. 9, the PPDU format that is applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, and so on).

Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields.

As described above, methods such as channel bonding, channel aggregation, and/or FDMA, which transmit data by using multiple channels at the same time, may be applied in the 11ay system that can apply the present disclosure. In particular, since the 11ay system uses signals of a high frequency band, a beamforming operation may be applied in order to transmit and/or receive signals at a high reliability level.

Figure 10:
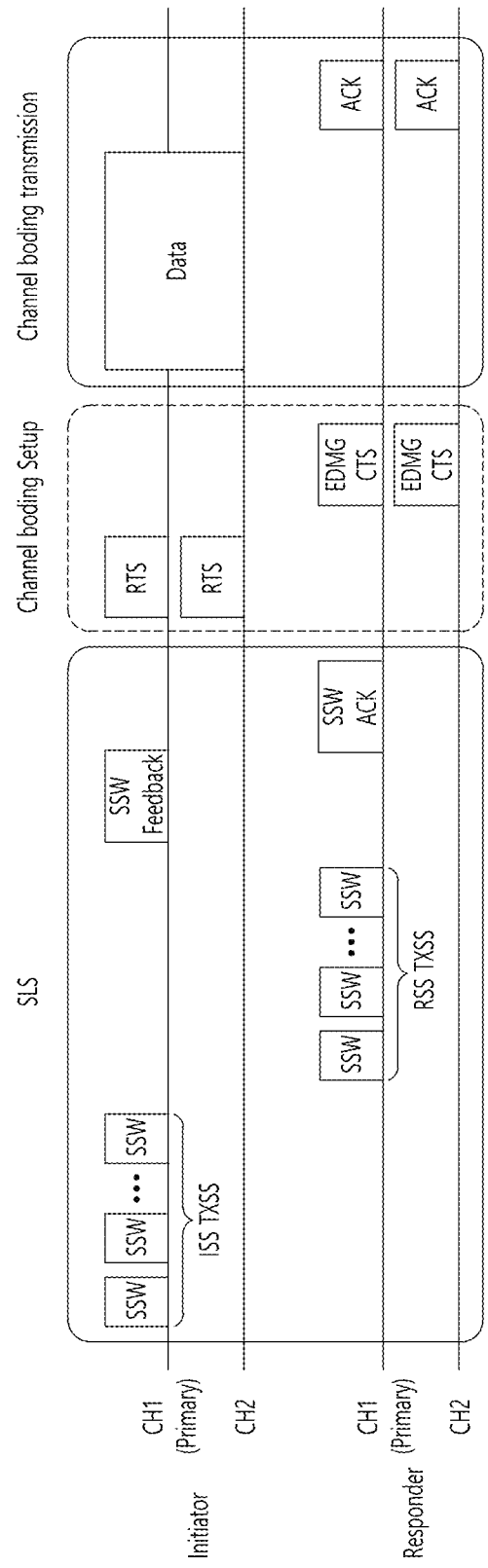
FIG. 10 illustrates operations of performing beamforming for a channel according to the embodiment of the present disclosure.

FIG. 10 illustrates operations of performing beamforming for a channel according to the embodiment of the present disclosure. Referring to FIG. 10, an STA that intends to transmit data through the beamforming operation is referred to as an initiator, and an STA that receives the data from the initiator is referred to as a responder.

Additionally, although FIG. 10 shows only a total of two channels (e.g., CH1, CH2), it shall be understood that the structure of the present specification may be extendedly applied also to channel bonding/channel aggregation through 3 or more channels.

As shown in FIG. 10, beamforming training according to the present embodiment may be configured of a Sector Level Sweep (SLS) phase (or step), a channel bonding setup phase, and a channel bonding transmission phase.

For reference, the SLS phase has the following characteristics.

In order to communicate (or transfer) data or control information, and so on, with higher reliability in a 60 GHz band that is supported in the 11ay system, a directional transmission method may be applied instead of an omni-transmission method.

STAs intending to transmit/receive data in the 11ay system may respectively know a TX best sector or RX best sector for the initiator and the responder through the SLS process. For reference, the SLS phase will hereinafter be described in more detail with reference to FIG. 12 and FIG. 13, which will be described later on.

Figure 11:
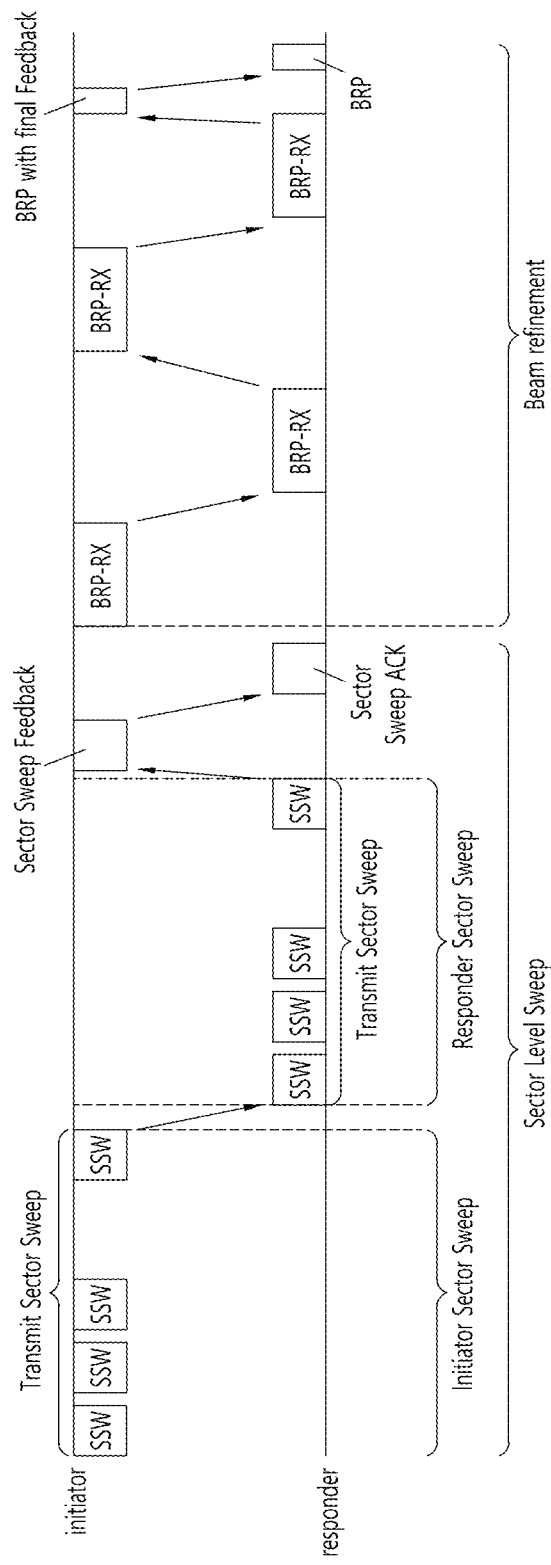
FIG. 11 shows an example of a beamforming training process according to an embodiment of the present disclosure.

FIG. 11 shows an example of a beamforming training process according to an embodiment of the present disclosure.

Referring to FIG. 1 to FIG. 11, in BF training, which occurs during Association Beamforming Training (A-BFT) allocation, an AP or PCP/AP is the initiator, and a non-AP and non-PCP/AP STA is the responder. In BF training, which occurs during SP allocation, a source (EDMG) STA of the SP is the initiator, and a target STA of the SP is the responder. In BF training, which occurs during Transmission Opportunity (TXOP) allocation, a TXOP holder is the initiator, and a TXOP responder is the responder.

A link from the initiator to the responder will be referred to as an initiator link, and a link from the responder to the initiator will be referred to as a responder link.

The BF training process starts with an SLS from the initiator. The purpose of the SLS phase is to enable communication between two STAs at a control PHY rate or higher MCS. Most particularly, the SLS phase provides only the transmission of the BF training.

Additionally, when a request is made by the initiator or responder, a Beam Refinement Protocol (or Beam Refinement Phase) (BRP) may be performed subsequent to the SLS phase.

The purpose of the BRP phase is to enable reception (RX) training and to enable iterative refinement of an Antenna Weight Vector (AWV) of all transmitters and receivers within all STAs. If one of the STAs participating in the beam training chooses to use a single transmission (TX) antenna pattern, the RX training may be performed as part of the SLS phase.

A more detailed description of the SLS phase is as follows. Herein, the SLS Phase may include: 1) Initiator Sector Sweep (ISS) for training an initiator link, 2) Responder Sector Sweep (RSS) for training a responder link, 3) SSW feedback, and 4) SSW ACK.

The initiator may start the SLS phase by transmitting a frame (or frames) of the ISS.

The responder does not start the transmission of a frame (or frames) of the RSS before the ISS is successfully completed. However, a case where the ISS occurs within a BTI may be excluded.

The initiator may not start the SSW feedback before the RSS phase is successfully completed. However, a case where the RSS occurs within a A-BFT may be excluded. The responder does not start the SSW ACK of the initiator within the A-BFT.

The responder starts the SSW ACK of the initiator immediately after the SSW feedback of the initiator has been successfully completed.

The BF frames being transmitted by the initiator during the SLS phase may include an (EDMG) beacon frame, an SSW frame, and an SSW feedback frame. During the SLS phase, the BF frames being transmitted by the responder may include an SSW frame and an SSW-ACK frame.

If each of the initiator and the responder performs a Transmit Sector Sweep (TXSS) during the SLS phase, at the end of the SLS phase, each of the initiator and the responder may possess its own transmit sector. If the ISS or RSS employs receive sector sweep, the responder or initiator may possess its own receive sector.

An STA does not change its transmission power (or transport power) during sector sweep.

Figure 12:
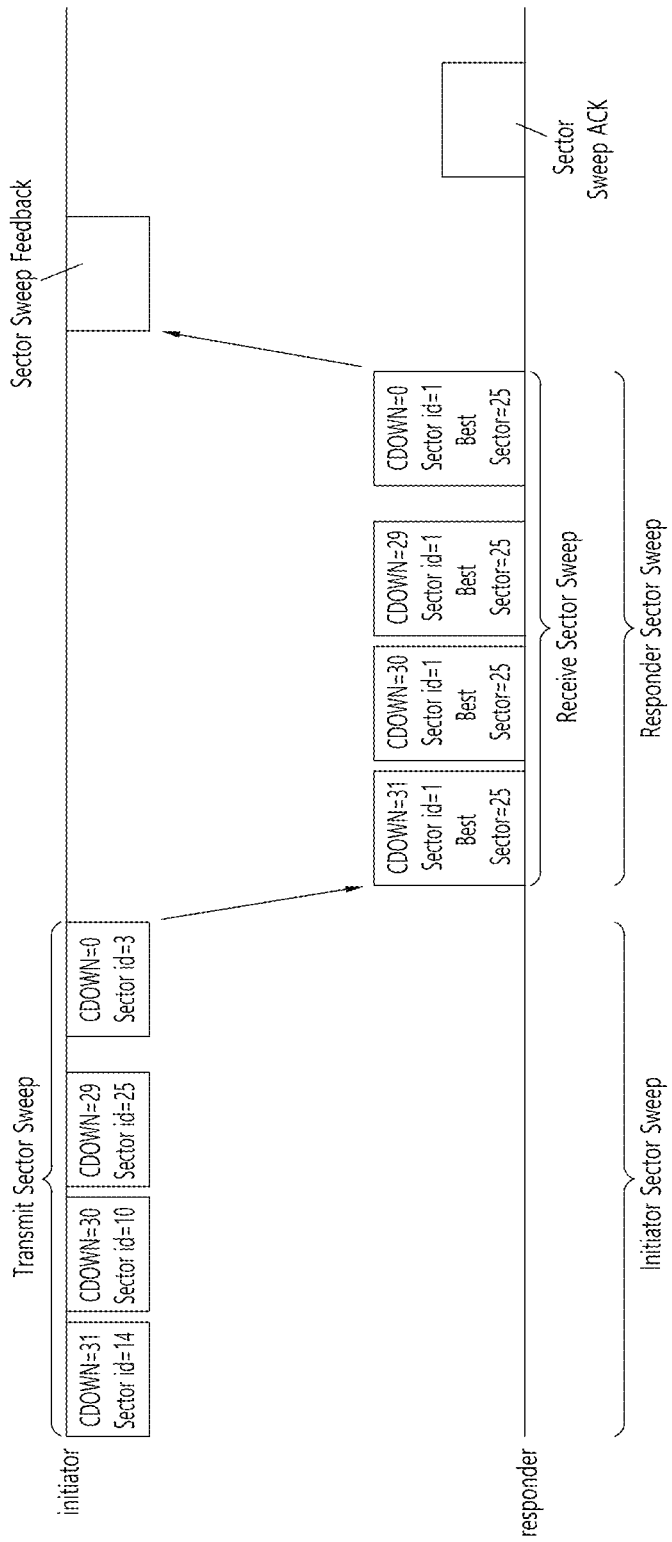
FIG. 12 and FIG. 13 are drawings showing examples of the SLS phase.
Figure 13:
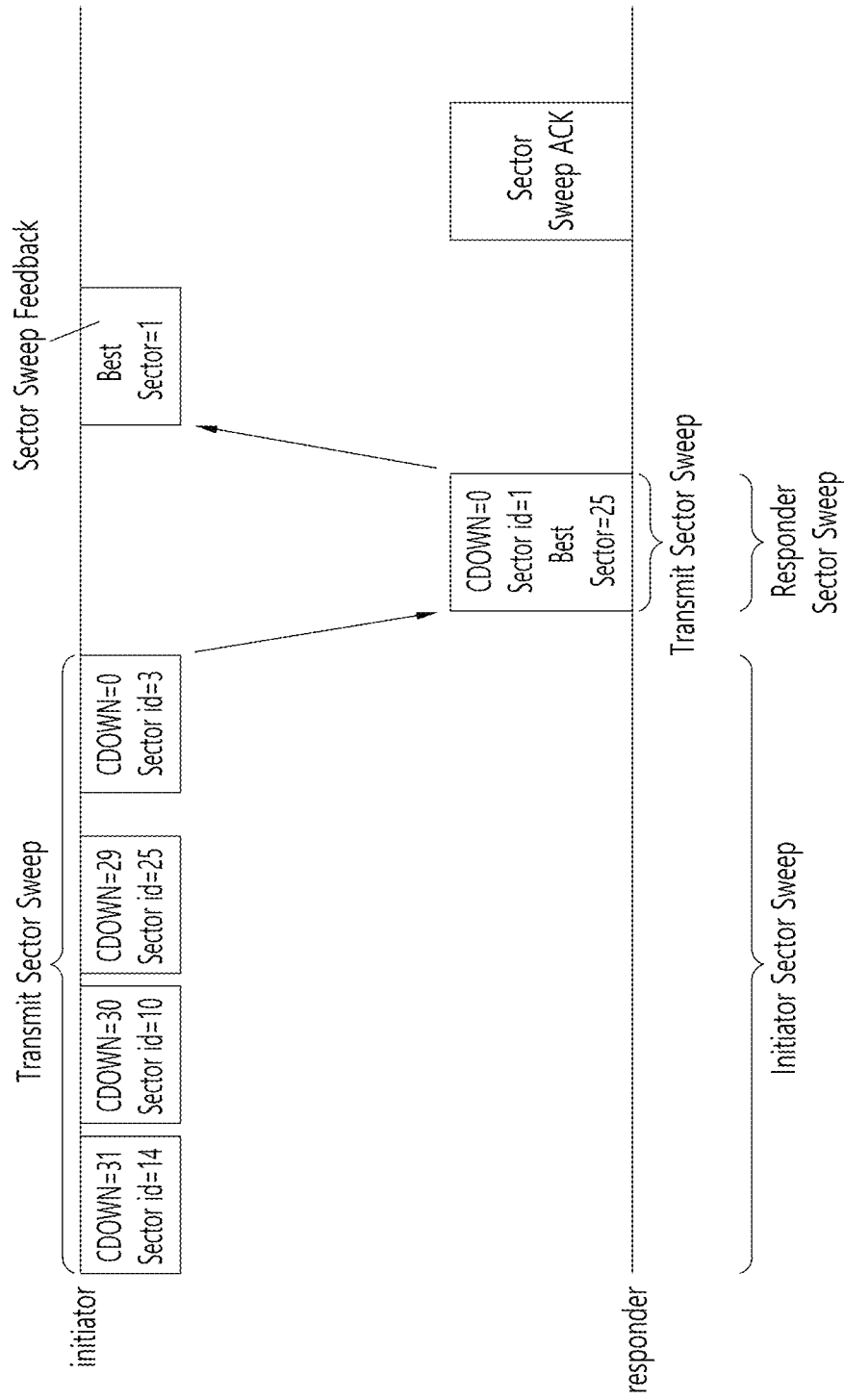

FIG. 12 and FIG. 13 are drawings showing examples of the SLS phase.

Referring to FIG. 12, the initiator has a large number of sectors, and the responder has one transmit sector and receive sector that is used in RSS. Accordingly, the responder transmits SSW frames through the same transmission sector, and, at the same time, the initiator may perform switching of the receive antenna(s).

Referring to FIG. 13, the initiator has a large number of sectors, and the responder has one transmit sector and receive sector that is used in RSS. In this case, the receive training for the initiator may be performed during the BPR phase.

The SLS phase according to the present embodiment may be summarized as follows.

The SLS phase is a protocol performing link detection in a 802.11ay system according to the present embodiment, and, herein, the SLS phase is a beam training method wherein the network nodes contiguously (or consecutively) transmit/receive frames including the same information of a reception channel link by changing only the beam direction, and wherein an indicator (e.g., Signal to Ratio (SNR), Received Signal Strength Indicator (RSSI), and so on) indicating the performance of a receive channel link, among the successfully received frames, selects the best beam direction.

Additionally, the BRP phase may be summarized as follows.

The BRP phase is a protocol finely adjusting the beam direction that may maximize the data transmission rate from the beam direction, which is selected in the SLS phase or by a different means, and the BRP phase may be performed when needed. The BRP phase performs the BRP training by using a BRP frame including beam training information and information reporting the training result, wherein the BRP frame is defined for the BRP protocol. For example, BRP is a beam training method, wherein a BRP frame is transmitted/received by using a beam that is determined during a previous beam training, and wherein beam training is substantially performed by using a beam training sequence, which is included at an end part of a successfully transmitted/received BRP frame. Although the SLS uses a whole frame (or the frame itself) for the beam training, BRP may be different from SLS in that it uses only the beam training sequence.

The above-described SLS phase may be performed within a Beacon Header Interval (BHI) and/or Data Transfer Interval (DTI).

Firstly, the SLS phase that is performed during a BHI may be the same as the SLS phase, which is defined in the 11ad system for its coexistence with the 11ad system.

Subsequently, the SLS phase that is performed during a DTI may be performed in case beamforming training is not performed between an initiator and a responder, or in case a beamforming (BF) link is lost. At this point, if the initiator and the responder are 11ay STAs, the initiator and the responder may transmit a short SSW frame for the SLS phase instead of the SSW frame.

Herein, the short SSW frame may be defined as a frame including a short SSW packet in a Data field of a DMG control PHY or DMG control mode PPDU. At this point, a detailed format of the short SSW packet may be configured differently depending upon the transmission purpose (e.g., I-TXSS, R-TXSS, and so on) of the short SSW packet. The characteristics of the above-described SLS phase may also be applied to all SLS phases that will hereinafter be described.

Figure 14:
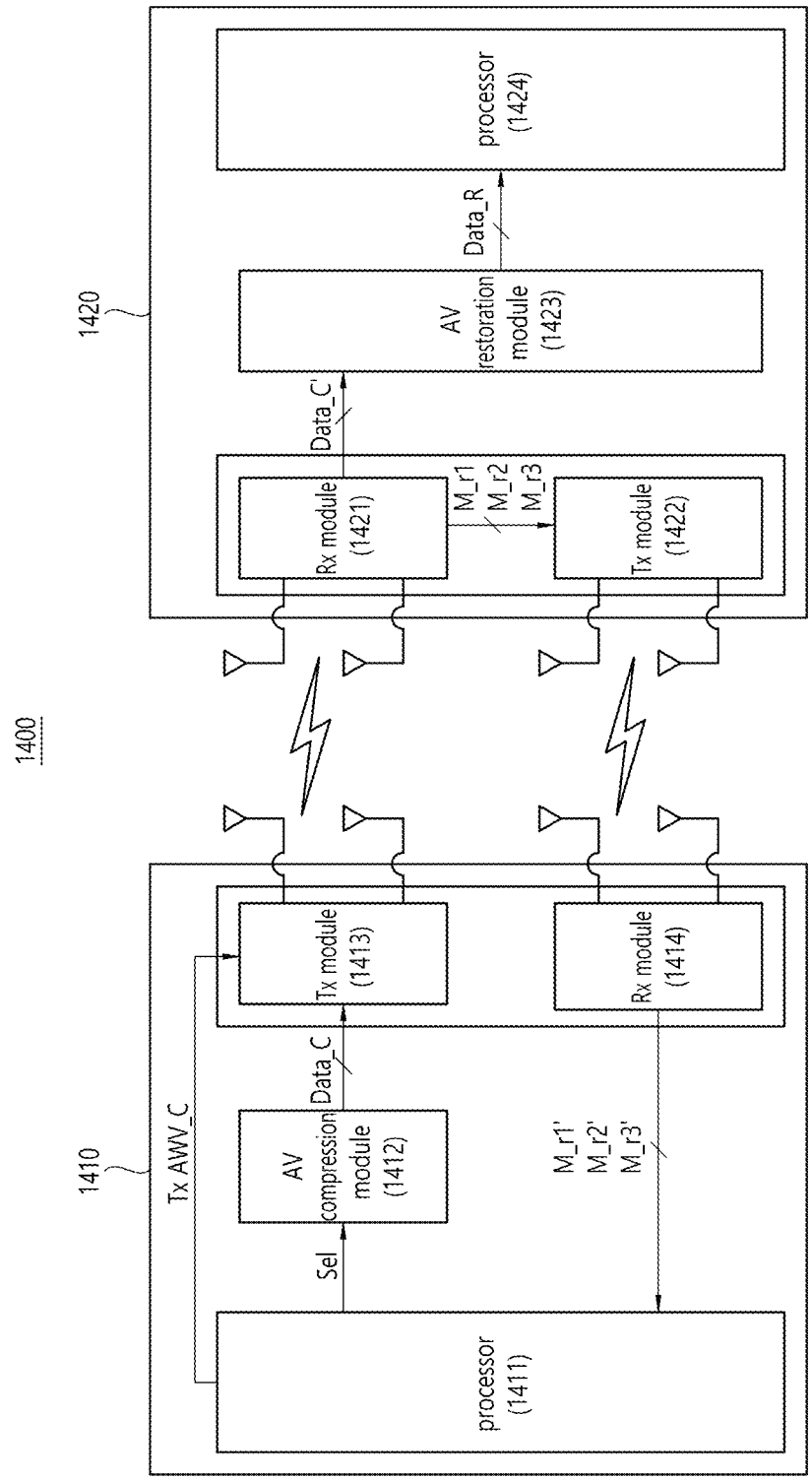
FIG. 14 is a block diagram showing the inside of an electronic device supporting a variable compression rate based on a radio link condition according to the present embodiment.

FIG. 14 is a block diagram showing the inside of an electronic device supporting a variable compression rate based on a radio link condition according to the present embodiment.

An electronic device 1400 according to the present embodiment may include a first device 1410 corresponding to a TV main body and a second device 1420 corresponding to a TV panel.

The first device 1410 according to the present embodiment may include a processor 1411, an audio video (AV) compression module 1412, a Tx module 1413, and an Rx module 1414.

The processor 1411 may control an overall operation for the electronic device 1400.

For example, upon determining that the radio link condition is good, image data may be relatively compressed less (e.g., when a compression rate is 1/4) so that an image of best quality is provided under the control of the second device 1420.

As another example, upon determining that the radio link condition is not good, the image data may be compressed more (e.g., when the compression rate is 1/10) so that screen stuttering is minimized under the control of the second device 1420.

For example, the processor 1411 may transfer a first control signal 'Tx AWV_C' associated with a transmit antenna weight vector (hereinafter, Tx AWV) to the TX module 1413. In this case, the first control signal 'Tx AWV_C' may be used to monitor the radio link condition with respect to the second device 1420.

In addition, the processor 1411 may receive monitoring result information M_r1', M_r2', and M_r3' associated with the radio link condition from the Rx module 1414. In this case, the monitoring result information M_r1', M_r2', and M_r3' associated with the radio link condition may be used to determine an available MCS based thereon.

In addition, the processor 1411 may determine the available MCS based on the monitoring result information M_r1', M_r2', and M_r3' associated with the radio link condition.

For reference, a process of determining an available MCS based on the monitoring result information M_r1', M_r2', and M_r3' associated with the radio link condition will be described in greater detail with reference to FIG. 15 to be described below.

In addition, the processor 1411 may determine a compression rate for a data stream, based on the determined MCS. For example, the compression rate for the data stream may be 1/4, 1/5, 1/6, or 1/10. For example, the compression rate for the data stream may be associated with a ratio for image compression and image restoration.

For reference, the process of determining the compression rate for the data stream, based on the determined MCS, will be described in greater detail with reference to FIG. 15 described below.

In addition, the processor 1411 may transfer a second control signal 'Sel' associated with the determined compression rate to the AV compression module 1412.

The AV compression module 1412 may compress the data stream according to the received second control signal 'Sel'. In addition, the AV compression module 1412 may transfer a compressed data stream Data_C to the Tx module 1413 in the form of a bit stream. In the present specification, the AV compression module 1412 may be referred to as a data compression module.

The Tx module 1413 may be associated with an Rx module 1421 of the second device 1420. The Tx module 1413 may support a TDD scheme in which the same frequency is time-divided. In the present specification, the Tx module 1413 may be referred to as a first Tx antenna module.

The Tx module 1413 may transmit a signal to the second device 1420 according to the received first control signal 'Tx AWV_C'. For example, the signal transmitted to the second device 1420 according to the first control signal 'Tx AWV_C' may be a signal transmitted in the SLS phase mentioned above with reference to FIG. 10 to FIG. 13.

In addition, the Tx module 1413 includes two antennas to increase a transfer rate, and may simultaneously transmit two bit streams. For example, the Tx module 1413 may transmit to the second device 1420 a compressed data stream Data_C received based on the two antennas.

The Rx module 1414 may be associated with a Tx module 1422 of the second device 1420. The Rx module 1414 may support a TDD scheme in which the same frequency is time-divided.

In the present specification, the Rx module 1414 may be referred to as a first Rx antenna module. In addition, the Rx module 1414 includes two antennas, and may simultaneously receive two bit streams. The Rx module 1414 may receive monitoring result information M_r1', M_r2', and M_r3' associated with the radio link condition from the Tx module 1422.

For example, the first monitoring result information M_r1' received from the first device 1410 through a radio link between the first device 1410 and the second device 1420 may be the same information as the first monitoring result information M_r1 generated by the Rx module 1421.

In addition, the second monitoring result information M_r2' received from the first device 1410 through the radio link between the first device 1410 and the second device 1420 may be the same information as the second monitoring result information M_r2 generated by the Rx module 1421.

In addition, the third monitoring result information M_r3' received from the first device 1410 through the radio link between the first device 1410 and the second device 1420 may be the same information as the third monitoring result information M_r3 generated by the Rx module 1421.

In addition, the Rx module 1414 may transfer the received monitoring result information M_r1', M_r2', and M_r3' to the processor 1411.

The second device 1420 according to the present embodiment may include the Rx module 1421, the Tx module 1422, an AV restoration module 1423, and a screen module 1424.

The Rx module 1421 may be associated with the Tx module 1413 of the first device 1410. The Rx module 1421 may support the TDD scheme in which the same frequency is time-divided. In the present specification, the Rx module 1421 may be referred to as a second Rx antenna module. In addition, the Rx module 1421 includes two antennas, and may simultaneously receive two bit streams.

The Rx module 1421 may receive a signal for monitoring the radio link condition, based on a receive antenna weight vector (hereinafter, Rx AWV). For example, the Rx module 1421 may receive the signal for monitoring the radio link condition while changing the Rx AWV.

In addition, the Rx module 1421 may measure channel capacity depending on a combination of the Tx AWV and the Rx AWV. Accordingly, the first monitoring result information M_r1 associated with the channel capacity depending on the combination of the Tx AWV and the Rx AWV and the second monitoring result information M_r2 associated with line of sight (LOS)/non-line of sight (NLOS) depending on the combination of the Tx AWV and the Rx AWV may be obtained.

Figure 17:
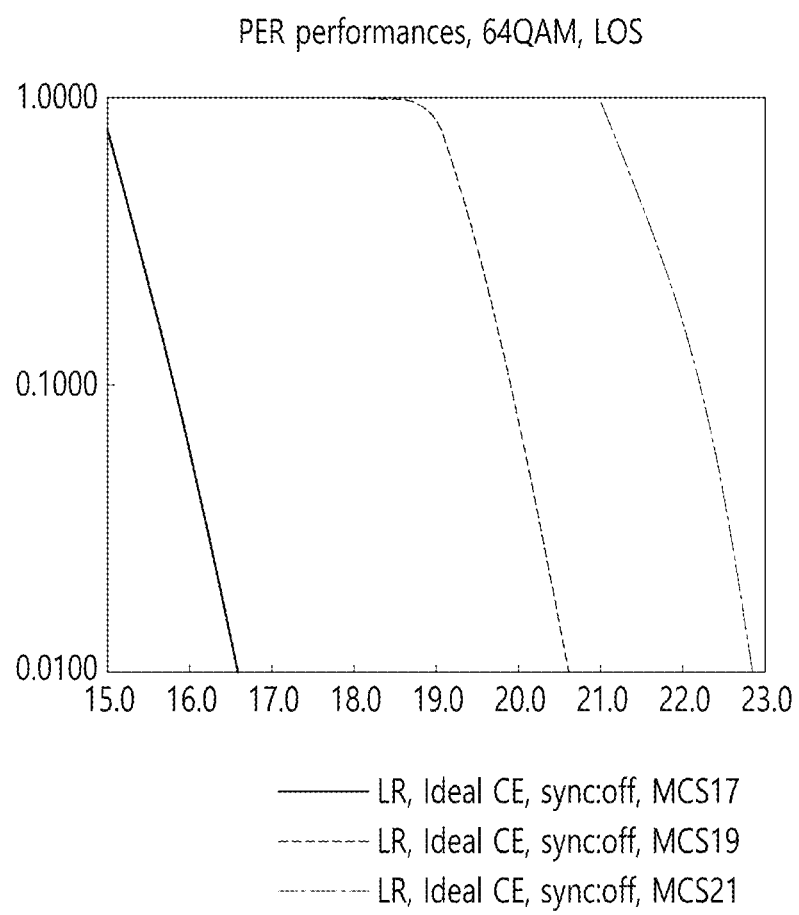
FIG. 17 and FIG. 18 show a graph used to select an MCS according to the present embodiment.
Figure 18:
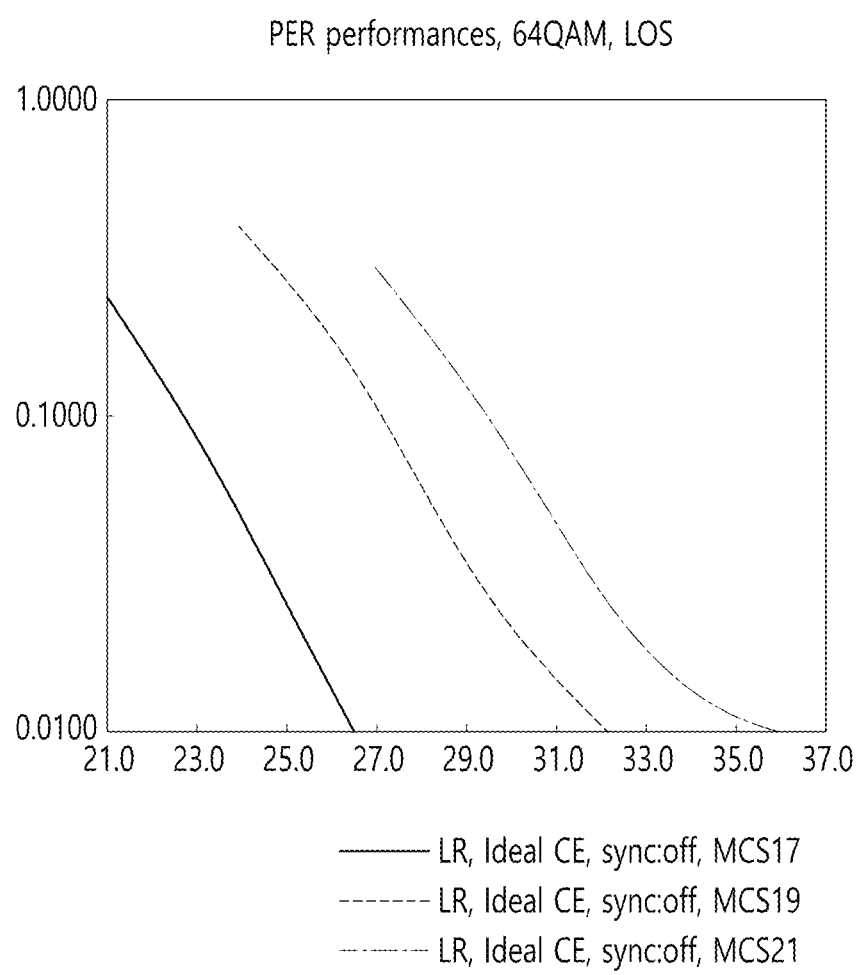

For example, an operation of determining the LOS and NLOS by means of the Rx module 1421 may be performed by using a profile of graphs illustrated in FIG. 17 and FIG. 18.

Further, the third monitoring result information M_r3 associated with maximum channel capacity depending on the combination of the Tx AWV and the Rx AWV may be obtained.

In addition, the Rx module 1421 may transmit the first to third monitoring result information M_r1, M_r2, and M_r3 to the Tx module 1422. In addition, the Rx module 1421 may transmit the received compressed data stream Data_C' to the AV restoration module 1423.

The Tx module 1422 may be associated with the Rx module 1414 of the first device 1410. The Tx module 1422 may support the TDD scheme in which the same frequency is time-divided. In the present specification, the Tx module 1422 may be referred to as a second Tx antenna module.

In addition, the Tx module 1422 includes two antennas to increase a transfer rate, and may simultaneously transmit two bit streams.

The Tx module 1422 may transmit to the first device 1410 the received first to third monitoring result information M_r1, M_r2, and M_r3. In this case, the first to third monitoring result information M_r1, M_r2, and M_r3 may be transmitted to the Rx module 1414 in the form of a bit stream.

The AV restoration module 1423 may perform an operation of restoring the received compressed data stream Data_C' to generate restored data stream Data_R. In the present specification, the AV restoration module 1423 may be referred to as a data restoration module.

In addition, the AV restoration module 1423 may transfer the restored data stream Data_R to the screen module 1424.

For example, the AV restoration module 1423 may obtain information on a compression rate determined by the first device 1410 through a syntax of a low level. Alternatively, the AV restoration module 1423 may obtain the information on the compression rate determined by the first device 1410 through header information of the received compressed data stream Data_C.

The screen module 1424 may include a plurality of organic light emitting diode (OLED) elements. For example, the screen module 1424 may reproduce an image, based on the received restored data stream Data_R.

It will be understood that the internal block diagram of FIG. 14 is for exemplary purposes only, and the present specification is not limited thereto. For example, the AV compression module 1412 may be a component included in the processor 1411.

Figure 15:
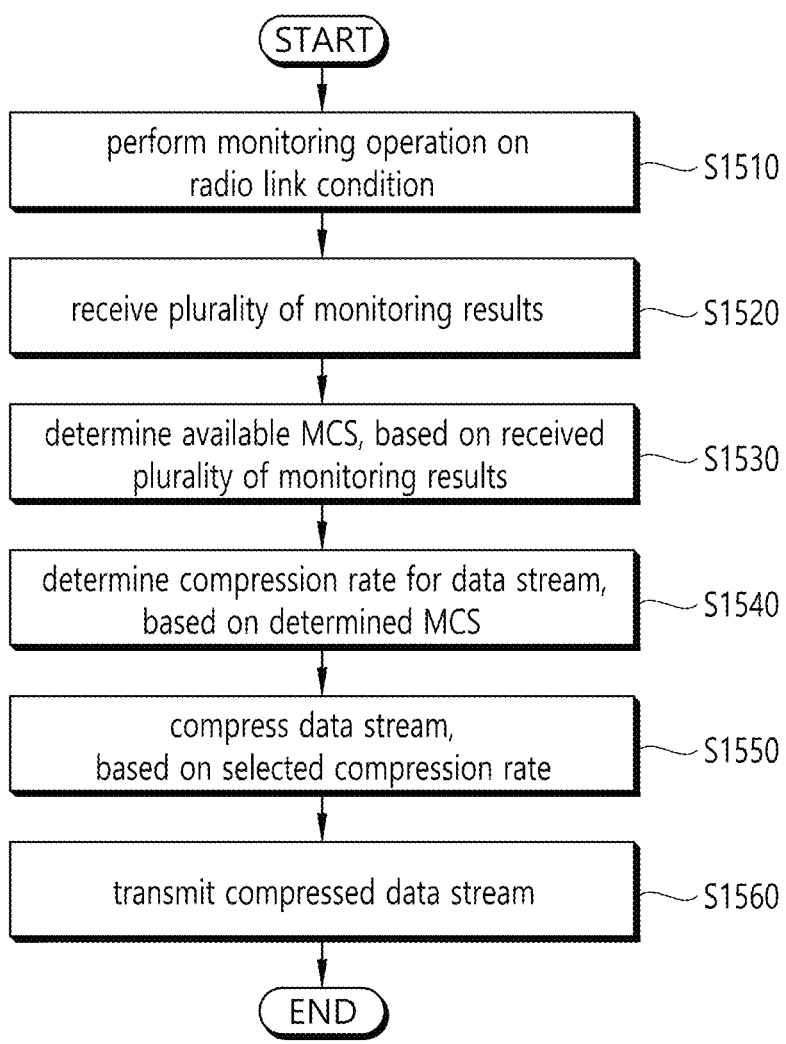
FIG. 15 is a flowchart showing an operation method of an electronic device supporting a variable compression rate based on a radio link condition according to the present embodiment, from a viewpoint of a main body device.

FIG. 15 is a flowchart showing an operation method of an electronic device supporting a variable compression rate based on a radio link condition according to the present embodiment, from a viewpoint of a main body device.

Referring to FIG. 14 and FIG. 15, in step S1510, a first device (e.g., 1410) corresponding to a TV main body of an electronic device (e.g., 1400) according to the present embodiment may perform monitoring on a radio link condition with respect to a second device (e.g., 1420) corresponding to a TV panel.

For example, according to a first control signal (e.g., the Tx AWV_C of FIG. 14) of the electronic device (e.g., 1400), the first device (e.g., 1410) may transmit to the second signal (e.g., 1420) a signal for monitoring the radio link condition, based on a Tx AWV associated with a Tx module (e.g., 1413) (i.e., while changing the Tx AWV according to the Tx AWV_C).

In this case, the signal for monitoring the radio link condition, transmitted according to the first control signal (e.g., the Tx AWV_C of FIG. 14), may correspond to a signal transmitted in the SLS phase mentioned above with reference to FIG. 10 to FIG. 13.

In step S1520, the first device (e.g., 1410) may receive a plurality of pieces of monitoring result information M_r1', M_r2', and M_r3' associated with the radio link condition from the second device (e.g., 1420). For example, the plurality of pieces of monitoring result information M_r1', M_r2', and M_r3' may be received based on the Rx module 1414.

For example, the received first monitoring result information M_r1' may be associated with channel capacity depending on a combination of the Tx AWV of the first device (e.g., 1410) and the Rx AWV of the second device (e.g., 1420).

For example, the received second monitoring result information M_r2' may be associated with LOS/NLOS depending on the combination of the Tx AWV of the first device (e.g., 1410) and the Rx AWV of the second device (e.g., 1420).

For example, the received third monitoring result information M_r3' may be associated with maximum channel capacity depending on the combination of the Tx AWV of the first device (e.g., 1410) and the Rx AWV of the second device (e.g., 1420).

In step S1530, the first device (e.g., 1410) may determine an MCS for the radio link condition, based on the plurality of pieces of monitoring result information M_r1', M_r2', and M_r3' associated with the radio link condition.

The first device (e.g., 1410) according to the present embodiment may map the received first monitoring result information M_r1' to a signal to noise ratio (SNR) value.

In addition, the first device (e.g., 1410) according to the present embodiment may determine whether the radio link condition is an LOS condition or an NLOS condition with respect to the second device (e.g., 1420), based on the second monitoring result information M_r2'.

For example, referring to FIG. 15 and FIG. 17, when it is determined as an LOS environment according to the second monitoring result information M_r2' and when the SNR value based on the first monitoring result information M_r1' is 23 dB, the MCS that can be used in the radio link condition may be determined as an MCS 21 of FIG. 17.

For example, referring to FIG. 15 and FIG. 18, when it is determined as an NLOS environment according to the second monitoring result information M_r2' and when the SNR value based on the first monitoring result information M_r1' is 27 dB, the MCS that can be used in the radio link condition may be determined as an MCS 17 of FIG. 18.

In step S1540, the first device (e.g., 1410) may determine an available compression rate for a data stream in the radio link condition, based on the determined MCS.

Table 1 and Table 2 below may be used to determine a compression rate at which real-time transmission is possible in the radio link condition. In addition, information as shown in Table 1 and Table 2 below may be information pre-stored in the first device (e.g., 1410).

Table 1 below shows an MCS capable of real-time transmission when the compression ratio is 1/4. An operation time of Table 1 below may be associated with a time for exchanging a packet between two electronic devices. For reference, the operation time of Table 1 may be set to 0.5 ms.

TABLE 1

MPDU Transmission Case

| MCS | Mod | Operation Time (ms) 0.500 1,670,528 |
|---|---|---|
| 2 | BPSK | 4.414 |
| 3 | BPSK | 3.541 |
| 4 | BPSK | 2.958 |
| 5 | BPSK | 2.734 |
| 6 | BPSK | 2.542 |
| 7 | QPSK | 2.230 |
| 8 | QPSK | 1.793 |
| 9 | QPSK | 1.502 |
| 10 | QPSK | 1.390 |
| 11 | QPSK | 1.294 |
| 12 | 16-QAM | 1.137 |
| 13 | 16-QAM | 0.919 |
| 14 | 16-QAM | 0.774 |
| 15 | 16-QAM | 0.717 |
| 16 | 16-QAM | 0.669 |
| 17 | 64-QAM | 0.773 |
| 18 | 64-QAM | 0.628 |
| 19 | 64-QAM | 0.531 |
| 20 | 64-QAM | 0.493 |
| 21 | 64-QAM | 0.461 |

Table 2 below shows an MCS capable of real-time transmission when the compression ratio is 1/6. An operation time of Table 2 below may be associated with a time for exchanging a packet between two electronic devices. For reference, the operation time of Table 2 may be set to 0.5 ms.

TABLE 2

MPDU Transmission Case

| MCS | Mod | Operation Time (ms) 0.500 1,177,528 |
|---|---|---|
| 2 | BPSK | 3.121 |
| 3 | BPSK | 2.506 |
| 4 | BPSK | 2.096 |
| 5 | BPSK | 1.938 |
| 6 | BPSK | 1.803 |
| 7 | QPSK | 1.583 |
| 8 | QPSK | 1.276 |
| 9 | QPSK | 1.071 |
| 10 | QPSK | 0.992 |
| 11 | QPSK | 0.924 |
| 12 | 16-QAM | 0.814 |
| 13 | 16-QAM | 0.660 |
| 14 | 16-QAM | 0.558 |
| 15 | 16-QAM | 0.519 |
| 16 | 16-QAM | 0.485 |
| 17 | 64-QAM | 0.558 |
| 18 | 64-QAM | 0.455 |
| 19 | 64-QAM | 0.387 |
| 20 | 64-QAM | 0.361 |
| 21 | 64-QAM | 0.338 |

For example, when the MCS value determined in step S1530 is 20 or 21, the compression rate for the data stream may be determined to 1/4 associated with Table 1, in consideration of the operation time.

As another example, when the MCS value determined in step S1530 is 16, 18, or 19, the compression rate for the data stream may be determined to 1/6 associated with Table 2, in consideration of the operation time.

However, when the MCS value determined in step S1530 is 20 or 21, the compression rate for the data stream may be determined to 1/6 associated with Table 2, in consideration of the radio link condition and the operation time.

It will be understood that Table 1 and Table 2 above are for exemplary purposes only, and the present specification is not limited thereto.

In step S1550, the first device (e.g., 1410) may compress the data stream, based on the determined compression rate. For example, the first device (e.g., 1410) may control the AV compression module 1412 to perform compression on the data stream, based on a second control signal 'Sel' associated with the compression rate determined in the previous step.

In step S1560, the first device (e.g., 1410) may transmit the compressed data stream to the second device (e.g., 1420). For example, the first device (e.g., 1410) may control the Tx module 1413 to transmit received compressed data stream Data_C.

Figure 16:
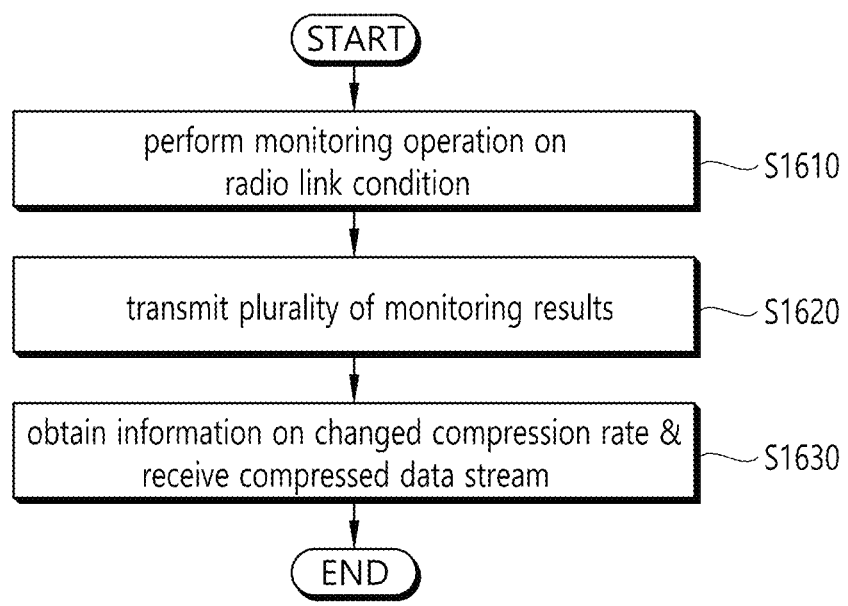
FIG. 16 is a flowchart showing an operation method of an electronic device supporting a variable compression rate based on a radio link condition according to the present embodiment, from a viewpoint of a panel device.

FIG. 16 is a flowchart showing an operation method of an electronic device supporting a variable compression rate based on a radio link condition according to the present embodiment, from a viewpoint of a panel device.

Referring to FIG. 15 and FIG. 16, in step S1610, a second device (e.g., 1420) of an electronic device (e.g., 1400) according to the present embodiment may perform a monitoring operation on a radio link condition with respect to a first device (e.g., 1410) corresponding to a TV main body.

For example, according to an Rx AWV pre-set in the second device (e.g., 1420), the second device (e.g., 1420) may receive from the second device (e.g., 1420) a signal for monitoring the radio link condition while changing the Rx AWV associated with the Rx module (e.g., 1421).

According to the present embodiment, the second device (e.g., 1420) may obtain a plurality of pieces of monitoring result information (e.g., M_r1, M_r2, and M_r3 of FIG. 14) by measuring channel capacity depending on a combination of the Tx AWV and the Rx AWV.

For example, the second device (e.g., 1420) may obtain first monitoring result information M_r1 associated with channel capacity based on the Tx AWV and the Rx AWV and second monitoring result information M_r2 associated with LOS/NLOS depending on the combination of the Tx AWV and the RX AWV according to the monitoring operation of the previous step.

For example, the operation of determining the LOS and NLOS by means of the Rx module 1421 may be performed by using a profile of graphs of FIG. 17 and FIG. 18.

Further, the second device (e.g., 1420) may obtain third monitoring result information M_r3 associated with maximum channel capacity depending on the combination of the Tx AWV and the Rx AWV according to the monitoring operation of the previous step.

In step S1620, the second device (e.g., 1420) according to the present embodiment may transmit the plurality of pieces of monitoring result information (e.g., M_r1, M_r2, and M_r3 of FIG. 14) to the first device (e.g., 1410).

In step S1630, the second device (e.g., 1420) according to the present embodiment may obtain information on the compression rate determined by the first device 1410.

The information on the compression rate determined by the first device 1410 may be obtained through a syntax of a low level or may be obtained based on header information of the compressed data stream. In addition, the second device (e.g., 1420) may receive the compressed data stream from the first device (e.g., 1410).

FIG. 17 and FIG. 18 show a graph used to select an MCS according to the present embodiment.

Referring to FIG. 17, packet error rate (PER) performance of a vertical axis is shown according to an SNR of a horizontal axis, when a radio link condition is associated with LOS and when 16QAM is applied for a radio link. As described above, when SNR is 23 dB in the LOS condition of FIG. 17, an MCS may be determined to 21.

Referring to FIG. 18, PER performance of a vertical axis is shown according to an SNR of a horizontal axis, when the radio link condition is associated with NLOS and when 64QAM is applied for a radio link. As described above, when SNR is 27 dB in the NLOS condition of FIG. 18, an MCS may be determined to 21.

Figure 19:
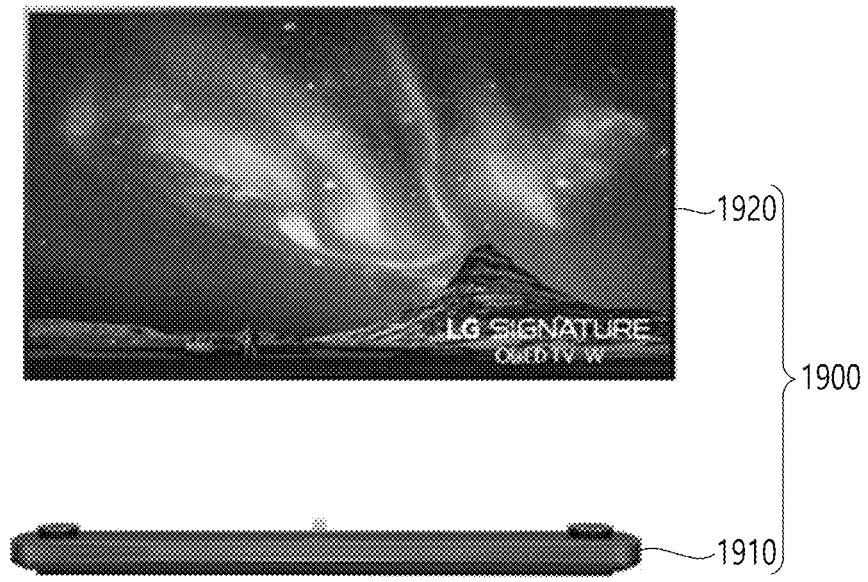
FIG. 19 shows an example of applying an electronic device supporting a variable compression rate, based on a radio link condition, according to the present embodiment.

FIG. 19 shows an example of applying an electronic device supporting a variable compression rate, based on a radio link condition, according to the present embodiment.

An electronic device 1900 according to the present embodiment may be a display device such as TV. The electronic device 1900 may include a first device 1910 corresponding to a main body device and a second device 1920 corresponding to a TV panel.

For example, the first device 1910 may be understood based on the description on the first device 1410 of FIG. 14. In addition, the second device 1920 may be understood based on the description on the second device 1420 of FIG. 14.

Although a detailed embodiment is described in the detailed description of the present specification, it will be apparent that various modifications can be made without departing from the scope of the present specification. And, therefore, the scope of the present specification shall not be limited only to the above-described embodiment and shall rather be determined based on the scope of the claims that will hereinafter be described as well as the equivalents of the scope of the claims of the present disclosure.

What is claimed is:

1. An electronic device comprising:
a first transmit (Tx) antenna module which transmits a monitoring signal for a radio link, based on a pre-set Tx antenna weight vector based on a first control signal;
a first receive (Rx) antenna module which receives the monitoring signal from the first Tx antenna module, based on the pre-set Rx antenna weight vector, and which generates first and second monitoring result information, based on the monitoring signal;
a second Tx antenna module which transmits the first and second monitoring result information;
a second Rx antenna module which receives the first and second monitoring information from the second Tx antenna module;
a processor which transfers the first control signal and a second control signal for a compression rate determined based on the first and second monitoring information; and
a data compression module which performs compression on a data stream, based on the second control signal.

2. The electronic device of claim 1,
wherein the first monitoring information is mapped to a signal to noise ratio (SNR) value for the radio link,
wherein a modulation and coding scheme (MCS) value for the radio link is determined based on the SNR value and the second monitoring information, and
wherein the compression rate is determined based on the MCS value.

3. The electronic device of claim 1,
wherein the first monitoring information is associated with channel capacity of the radio link, and
wherein the first monitoring information is generated based on the monitoring signal, the Tx antenna weight vector, and the Rx antenna weight vector.

4. The electronic device of claim 1, wherein the second monitoring information comprises information for notifying whether the radio link is in a line of sight (LOS) condition or a non-line of sight (NLOS) condition.

5. The electronic device of claim 1, wherein the first Rx antenna module further receives the compressed data stream from the first Tx antenna module.

6. The electronic device of claim 5, further comprising a data restoration module which receives the compressed data stream from the first Rx antenna module and generates a data stream restored based on the compressed data stream.

7. The electronic device of claim 6, further comprising a screen module which receives the restored data stream from the data restoration module and reproduces the restored data stream.

8. The electronic device of claim 7, wherein the first Rx antenna module, the second Tx antenna module, the data restoration module, and the screen module are comprised in a panel device.

9. The electronic device of claim 1, wherein the first Tx antenna module, the second Rx antenna module, the processor, and the data compression module are comprised in a main body device.

10. The electronic device of claim 1,
wherein each of the first Tx antenna module and the second Tx antenna module comprises two Tx antennas, and
wherein each of first Rx antenna module and the second Rx antenna module comprises two Rx antennas.

11. The electronic device of claim 10,
wherein the first Tx antenna module is associated with the first Rx antenna module, and
wherein the second Tx antenna module is associated with the second Rx antenna module.

\* \* \* \* \*